(12) United States Patent
Iguchi et al.

(10) Patent No.: US 6,269,541 B1
(45) Date of Patent: Aug. 7, 2001

(54) METHOD OF MANUFACTURING A HEAT EXCHANGER

(75) Inventors: Takeshi Iguchi, Gifu; Homare Kotate; Akira Uchikawa, both of Nagoya; Koji Hirakami, Okazaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/300,673

(22) Filed: Apr. 27, 1999

(30) Foreign Application Priority Data

Apr. 28, 1998 (JP) .................................................. 10-119069

(51) Int. Cl.⁷ .................................................. B23K 31/00
(52) U.S. Cl. ................. 29/890.054; 29/890.045; 29/890.047
(58) Field of Search ............... 29/890.054, 890.047, 29/890.045; 165/152; 228/183

(56) References Cited

U.S. PATENT DOCUMENTS

| 3,693,710 | | 9/1972 | Drosnin . | |
|---|---|---|---|---|
| 4,626,295 | * | 12/1986 | Sasaki et al. | 29/890.054 |
| 4,843,693 | * | 7/1989 | Chisholm | 29/890.054 |
| 5,005,285 | * | 4/1991 | Ishii | 29/890.043 |
| 5,685,075 | * | 11/1997 | Kato | 29/890.054 |

FOREIGN PATENT DOCUMENTS

| 053 452 | 6/1982 | (EP) . |
|---|---|---|
| 0 546 334A1 | 6/1993 | (EP) . |
| 574949 | 1/1946 | (GB) . |
| A-6-170520 | 6/1994 | (JP) . |
| A-7-32133 | 2/1995 | (JP) . |

* cited by examiner

*Primary Examiner*—I Cuda Rosenbaum
(74) *Attorney, Agent, or Firm*—Harness, Dickey & Pierce, PLC

(57) ABSTRACT

Fins and tubes are brazed by brazing material spread on the inside of bent portions. As the interval between the fins and the tubes does not increase upon melting the brazing material, the tubes and the fins can be easily piled and assembled with each other, and the operability in assembling a heat exchanger can be improved. Further, as the brazing material remains mainly around the bent portions, most parts of the fins and the tubes are not covered with the brazing material, and there is no diffusion of the brazing material at the heating of the brazing step. Accordingly, heat exchanging performance of the heat exchanger can be improved, and even if the thickness of the fins and that of the tubes are reduced, the occurrence of the erosion can be prevented.

5 Claims, 2 Drawing Sheets

METHOD OF MANUFACTURING A HEAT EXCHANGER

CROSS REFERENCE TO RELATED APPLICATION

This application is based upon and claims priority from Japanese Patent Application No. Hei. 10-119069 filed Apr. 28, 1998, the contents of which are incorporated herein by reference.

BACKGROUND OF THE INVENTION

1. Field of the Invention

The present invention relates to a heat exchanger having tubes through which fluid passes and corrugated fins.

2. Description of Related Art

Conventionally, tubes and fins are joined with each other by brazing material covering (clad) the surface of the tubes or fins.

However, the tubes or fins covered by the brazing material are high in manufacturing cost. Furthermore, if the fin is covered by the brazing material, the heat exchanging performance of the heat exchanger is reduced due to diffusion effect of the brazing material at the heating of the brazing process.

Further, if the thickness of the tubes and the fins is reduced to improve the heat exchanging performance, a problem may be noticeable that erosion occurs in the tube or fin due to the diffusion effect of the brazing material.

To solve these problems, it may be possible to spread brazing material, in form of paste, powder, solid or the like, only on contact portions of fin or tube. However, as the tube interval (the difference in size between the peak and the valley of the fin) increases by the thickness of the spread brazing material, it is difficult to, for example, insert and assemble the tubes into a header tank (core plate), thereby compromising the assembly of fins, tubes and the like and reliability of brazing between the fins and the tubes.

Further, according to the above method, the brazing material is rubbed and may be easily removed when the tubes and the fins are combined.

SUMMARY OF THE INVENTION

The present invention is made in light of the foregoing problems, and it is an object of the present invention of provide a heat exchanger which can improve its assembling operability and heat exchanging performance.

According to the heat exchanger of the present invention, a fin has bent portions and a hole formed through the bent portions, and the fin and tubes are brazed by brazing material spread on the inside of bent portions of the fin.

That is, the tubes and the fin are brazed by the brazing material spread on the inside of the bent portions of the fin, as the brazing material melts upon heating in brazing process and leaks through the hole to the outside of the bent portions. Accordingly, the tubes and the fins can be easily piled and assembled without increasing the tube interval. Accordingly, the assembling operability of the heat exchanger is improved, and the tubes and the fin can be reliably brazed with each other.

Further, since the brazing material remains mainly around the bent portions, most parts of the fin and the tubes are not covered with the brazing material. Thus, there is no diffusion effect, and the heat exchanging performance of the heat exchanger is improved, and the occurrence of the erosion is prevented even if the thickness of the fin and the tubes is reduced.

Further, because it is not necessary to coat the entire surface of the tubes and the fins with the brazing material, the required amount of the brazing material can be reduced to a minimum amount. Therefore, increase in costs regarding these materials is prevented. As a result, the manufacturing cost for the heat exchanger is reduced.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENT

An embodiment of the present invention will be described hereinafter with reference to the drawings.

Figure 1:
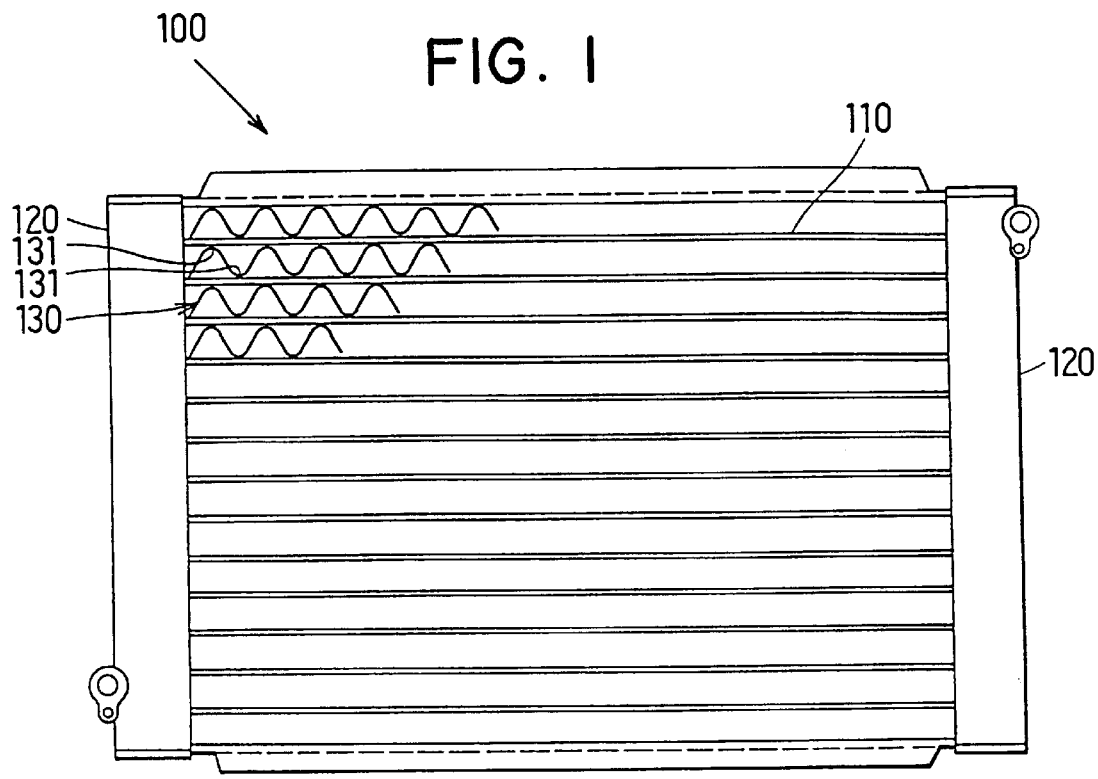
FIG. 1 is a schematic front elevation of a condenser according to an embodiment of the present invention.

This embodiment is a heat exchanger according to the present invention applied to a condenser for a refrigeration cycle. FIG. 1 is a schematic front elevation of a condenser 100. In FIG. 1, numeral 110 denotes a plurality of flat tubes (hereinafter, simply referred to as "tubes") through which a coolant (fluid) passes. Both ends of the tube 110 in their lengthwise direction are inserted into header tanks 120.

Further, corrugate fins (hereinafter, simply referred to as "fins") 130, having a corrugated shape with a plurality of bent portions 131, are provided between the respective tubes 110. The fins 130 are joined with the tubes 110 at the outside portions of the bent portions 131.

Figure 2:
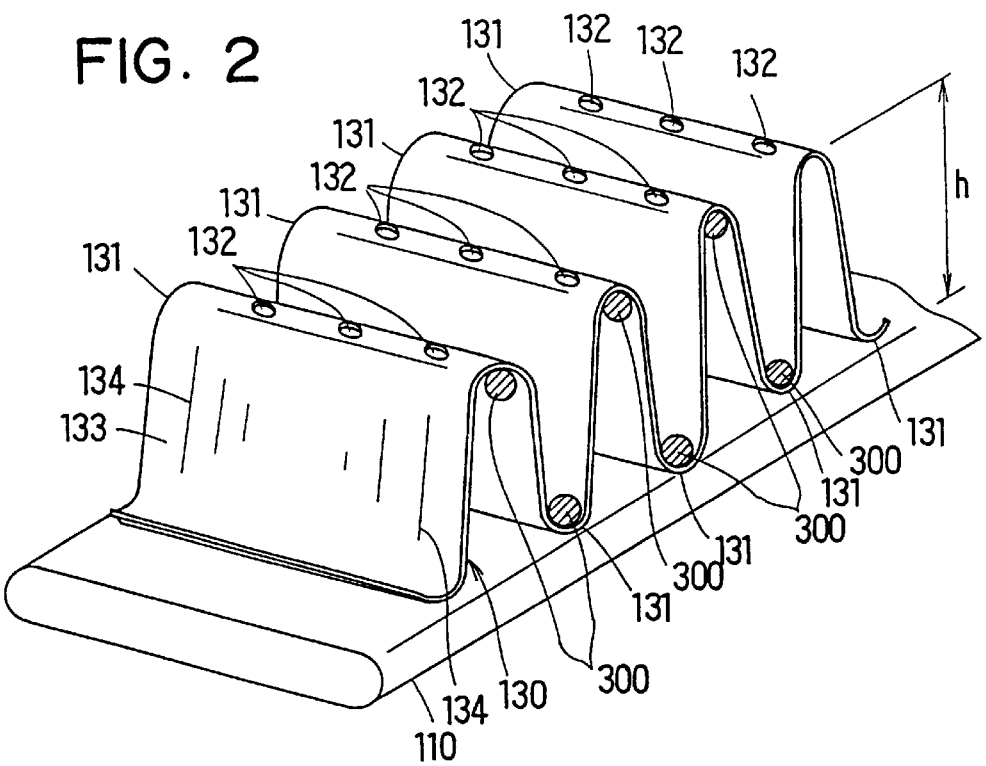
FIG. 2 is a part of an enlarged schematic perspective view showing a tube and a fin according to the embodiment of the present invention.

In the bent portions 131, a plurality of holes 132 are formed through their thickness direction in positions in contact with the tubes 110, as shown in FIG. 2. The tubes 110 and the fins 130 are brazed by brazing material spread inside the bent portions 131, as described hereinafter.

Next, a method for manufacturing the condenser 100 will be described.

First, a method for manufacturing the fin 130 (fin manufacturing process) will be described with reference to a fin manufacturing apparatus 200 shown in FIG. 3.

Figure 3:
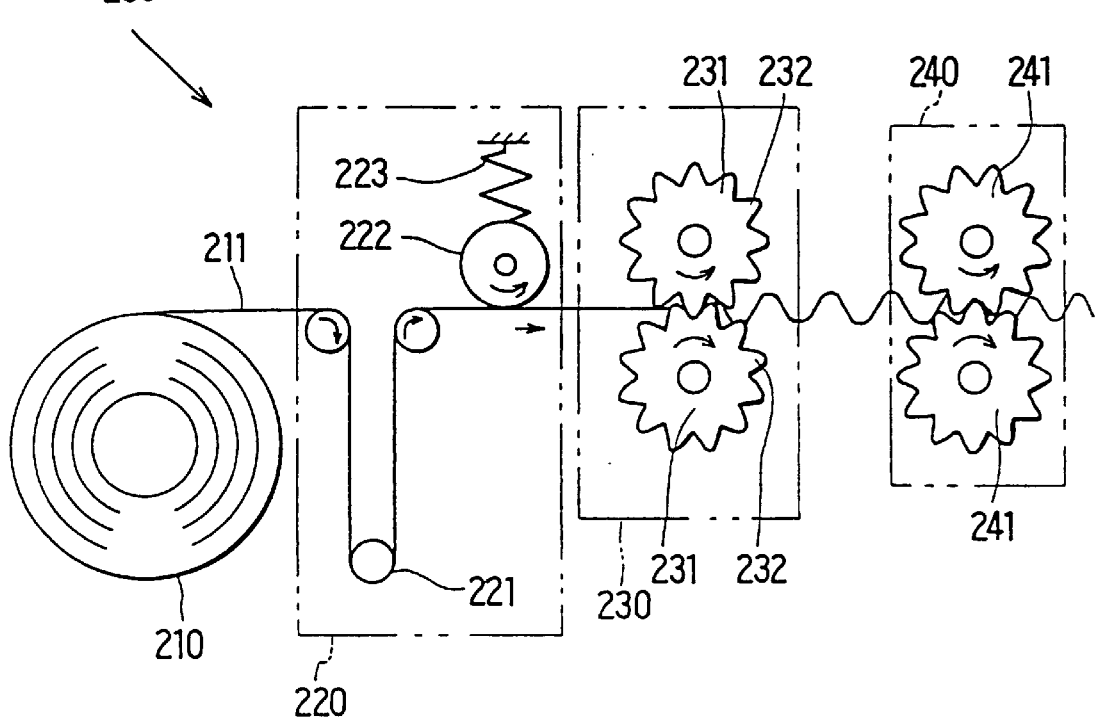
FIG. 3 is a schematic illustration of a fin manufacturing apparatus according to the embodiment of the present invention.

In FIG. 3, numeral 210 denotes a material roll (uncoiler) which comprises a winding of a thin-plate fin material 211. The fin material 211 taken from the material roll receives tension from a tension device 220 which provides predetermined tension to the fin material 211.

Note that the tension device 220 comprises a weight tension portion 221 which provides a predetermined tension to the fin material 211 by gravity, a roll 222 which rotates with the progress of the fin material 211, and a roll tension portion 223 which includes a spring means 223 and provides predetermined tension to the fin material 211 via the roll 222.

Note that the tension device 220 provides the predetermined tension to the fin material 211 in order to maintain the height h (see FIG. 2) of the fin, bent by a fin forming device 230 to be described later, constant.

Numeral 230 denotes the fin forming device which forms bending portions 131 in the fin material 211, provided with the predetermined tension by the tension device 220, and forms louvers 134 (See FIG. 2) in flat surfaces 133 (See FIG. 2) connected to the bent portions 131 to facilitate the heat exchange, and forms holes 132 in the bent portions 131.

The fin forming device 230 has a pair of gear-shaped formation rolls 231. The formation roll 231 has a tooth portion 232 having a cutter (not shown) to form the louvers 134 and another cutter (not shown) to form the holes 132. When the fin material 211 passes between the formation rolls 231, the fin material is bent along the tooth portions 232, and the bent portions 131, the Louvers 134 and the holes 132 are formed (fin forming step).

Numeral 240 denotes a feeding device which feeds the fin material 211 after the fin forming step to the next step. The feeding device 240 comprises a pair of gear-shaped feed rollers 241 having a reference pitch approximately the same as that between the bent portions 131 formed by the fin forming device 230.

Figure 4:
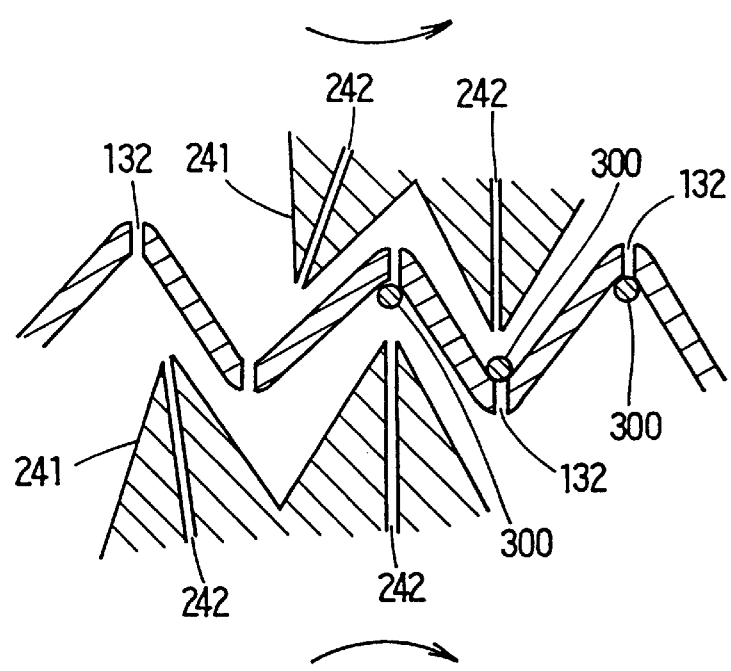
FIG. 4 is a part of an enlarged schematic cross section of a feed roller according to the embodiment of the present invention.

As shown in FIG. 4, in a tooth end of the feed roller 241, a brazing material supply hole 242 is formed to supply paste brazing material 300 to the inside of the bent portions 131. By this feeding device, the brazing material 300 is spread on the inside of the bent portions 131 (brazing material spreading step).

Next, the fins 130 manufactured at the fin manufacturing step (fin manufacturing device 200) and tubes 110 are piled and assembled with each other (See FIG. 1), and the header tanks 120 are inserted into the tubes 110. Then the elements 110, 120, 13 and the like are fixed by jigs (not shown) (assembling step).

Thereafter, the assembly formed at the assembling step is heated within a furnace to braze the tubes 110, the header tanks 120 and the fins 130 (brazing step).

At the brazing step, as the brazing material 300 spread inside the bent portions 131 melts and leaks through holes 132 to the outside of the bent portions 131, the tubes 110 and the fins 130 are brazed with each other.

Note that the header tanks 120 and the tubes 130 are brazed by brazing material clad on the surface of the header tanks 120.

Next, the feature of the embodiment will be described.

According to the embodiment, as the bent portions 131 are provided with the holes 132, and the brazing material is applied to the inside of the bent portions 131, the fins 130 and the tubes 110 are brazed. Thus, the increase in interval between the fins 130 and the tubes 110 does not occur.

Further, since the tubes 110 and the fins 130 can be easily piled and combined with each other, the operability in assembling the condenser (heat exchanger) 100 can be improved.

Further, since the brazing material is spread on the inside of the bent portions 131, when the tubes 110 and the fins are assembled with each other, the spread brazing material is prevented from falling from the fins 130 can be prevented. As a result, the yield of the condenser 100 can be improved since the brazing failure can be prevented.

Further, after the brazing step, the brazing material remains mainly around the bent portions 131. Accordingly, most parts of the fins 130 and the tubes 110 are not covered with the brazing material, and the heat exchanging performance of the condenser 100 can be improved, and the occurrence of erosion in the entire fins 130 and the tubes 110 can be prevented.

Further, as it is not necessary to clad any of the tube 110 and the fin 130 with the brazing material, increase in costs regarding these materials can be prevented, and as a result, increase in manufacturing cost of the condenser 100 can be prevented.

In the above embodiment, the heat exchanger according to the present invention has been described as the condenser, however, the present invention is not limited to it, but applicable to any other heat exchangers such as a radiator.

Further, in the above embodiment, the heat exchanger is a so-called multi-flow type heat exchanger having the header tanks 120. However, the present invention can be applied to a heat exchanger without header tank such as a serpentine-type heat exchanger.

Further, in the above embodiment, the fin 130 has a sine-wave shape, however, it may have a rectangular-wave shape.

Further, in the above embodiment, the brazing material is supplied from the tooth distal ends of the feed roller 241 to the inside of the bent portions 131. However, the present invention is not limited to this arrangement, and the brazing material may be spread on the inside of the bent portion 131 by any other means. Further, the shape of the holes 132 formed in the bent portions 131 is not limited to that in the above embodiment, but may be a linear slit shape or a bore shape like a needled hole or the like. Further, the number of the holes 132 may be single.

What is claimed is:

1. A method for manufacturing a heat exchanger having a plurality of tubes and a corrugated fin having a plurality of bent ridge portions connected to one of said plurality of tubes;

said method comprising:
manufacturing said fins by bending a metal plate to form said plurality of bent ridge portions each having an outer edge for contacting and connecting to one of said plurality of tubes, and forming holes at only said plurality of bent ridge portions through a thickness direction of said plurality of bent ridge portions;
disposing brazing material at an inner edge of said plurality of bent ridge portions;
assembling said fin with said plurality of tubes such that the outer edge of said plurality of bent ridge portions contact one of said plurality of tubes; and
brazing said outer edge of said plurality of bent portions to one of said plurality of tubes, wherein
the brazing material flows from the inner edge to the outer edge through said holes during the brazing process.

2. A method for manufacturing a corrugated fin, for a heat exchanger including a plurality of tubes, having a plurality of bent ridge portions brazed with one of said plurality of tubes;

the method comprising:
shaping a metal thin plate into a corrugated shape having said plurally of bent ridge portions each having an outer edge for contacting and connecting with one of said plurality of tubes, and forming a hole at only said plurality of bent ridge portions;
disposing brazing material on an inner edge of said plurality of bent ridge portions, which is opposite to said outer edge; and
brazing said outer edge of said plurality of bent ridge portions to one of said plurality of tubes, wherein
the brazing material flows from the inner edge to the outer edge through said holes during the bracing process.

3. A method for manufacturing a heat exchanger comprising:
- providing a metal plate;
- forming a plurality of bent ridge portions each having an in said metal plate;
- forming a hole at only each of said plurality of bent ridge portions;
- disposing brazing material at an inner edge of adjacent each of said plurality of bent ridge portions;
- providing a first and second tube;
- positioning said metal plate between said first and second tubes such that the outer edge of said plurality of bent ridge portions contact said first and said second tube; and
- heating said metal plate and said tubes to melt said brazing material, wherein
- the brazing material flows from the inner edge to the outer edge through said hold during the heating process.

4. The method according to claim 3 further comprising fixturing said metal plate and said tubes in a jig prior to said heating step.

5. A method for manufacturing a heat exchanger having a plurality of tubes and a corrugated fin having a plurality of bent ridge portions connected to one of said plurality of tubes;

said method comprising:
- manufacturing said fin by forming holes within a metal plate, and bending said metal plate such that areas where the holes are formed become said plurality of bent ridge portions each having an outer edge for contacting and connecting to one of said plurality of tubes;
- disposing brazing material at an inner edge of said plurality of bent ridge portions;
- assembling said fin with said plurality of tubes such that the outer edge of said plurality of bent ridge portions contact one of said plurality of tubes; and
- brazing said outer edge of said plurality of bent ridge portions to one of said plurality of tubes, wherein:
- the brazing material flows from the inner edge to the outer edge through said holes during the brazing process.

* * * * *